(12) United States Patent
Yablokov

(10) Patent No.: US 8,767,694 B2
(45) Date of Patent: Jul. 1, 2014

(54) SYSTEM AND METHOD FOR PERFORMING ADMINISTRATIVE TASKS ON MOBILE DEVICES

(71) Applicant: Kaspersky Lab ZAO, Moscow (RU)

(72) Inventor: Victor V. Yablokov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 13/730,557

(22) Filed: Dec. 28, 2012

(65) Prior Publication Data

US 2014/0095682 A1 Apr. 3, 2014

(30) Foreign Application Priority Data

Sep. 28, 2012 (RU) .................................. 2012141472

(51) Int. Cl.
*H04W 4/00* (2009.01)
*H04W 12/08* (2009.01)

(52) U.S. Cl.
CPC .............. *H04W 12/08* (2013.01); *H04W 4/001* (2013.01)
USPC .......................................................... 370/338

(58) Field of Classification Search
None
See application file for complete search history.

(56) References Cited

U.S. PATENT DOCUMENTS

| | | | |
|---|---|---|---|
| 5,787,248 A * | 7/1998 | Zupcsics et al. ............... | 709/230 |
| 7,478,381 B2 | 1/2009 | Roberts et al. | |
| 7,584,467 B2 | 9/2009 | Wickham et al. | |
| 7,694,296 B1 | 4/2010 | Kennedy | |
| 2004/0237083 A1 | 11/2004 | Alcazar et al. | |
| 2005/0132357 A1 | 6/2005 | Shell et al. | |
| 2006/0075070 A1 | 4/2006 | Merissert-Coffinieres et al. | |
| 2008/0010243 A1 | 1/2008 | Weissman et al. | |
| 2009/0119760 A1 * | 5/2009 | Hung et al. ........................ | 726/6 |
| 2009/0129292 A1 * | 5/2009 | Dholakia et al. .............. | 370/254 |
| 2009/0292909 A1 | 11/2009 | Feder et al. | |
| 2010/0064341 A1 | 3/2010 | Aldera | |
| 2010/0287582 A1 * | 11/2010 | Barnett, Jr. ...................... | 725/25 |

(Continued)

FOREIGN PATENT DOCUMENTS

| | | |
|---|---|---|
| EA | 12934 B1 | 2/2010 |
| RU | 2419250 C2 | 5/2011 |
| RU | 2455768 C2 | 7/2012 |

OTHER PUBLICATIONS

"CPE WAN Management Protocol, v1.1", Technical Report TR-069, Issue 1 Amendment 2, The Broadband Forum, Dec. 2007.*

(Continued)

*Primary Examiner* — Dang Ton
*Assistant Examiner* — Ronald h Davis
(74) *Attorney, Agent, or Firm* — Arent Fox LLP; Michael Fainberg

(57) ABSTRACT

Disclosed are system, method and computer program product for remote administration of mobile devices. The system includes an administration server that receives a request to perform a remote administrative task on a mobile device. The server selects a function that performs the requested remote administrative task. The server identifies one or more management protocols that perform the selected function, wherein different protocols use different mechanisms to perform the same function. The server determines if the mobile device supports one or more of the identified protocols. When the mobile device supports two or more different management protocols, the server selects a protocol with the highest priority for performing the selected function. The server then executes the selected management protocol to perform the selected function that performs the requested remote administrative task on the mobile device.

17 Claims, 7 Drawing Sheets

(56) References Cited

U.S. PATENT DOCUMENTS

| | | | |
|---|---|---|---|
| 2011/0029607 A1* | 2/2011 | Rao | 709/203 |
| 2011/0145927 A1 | 6/2011 | Hubner et al. | |
| 2013/0042088 A1* | 2/2013 | Archer et al. | 712/30 |

OTHER PUBLICATIONS

"Provisioning Bootstrap", Approved Version 1.1, OMA-WAP-TS-ProvBoot-V1_1-20090728-A, Open Mobile Alliance, Jul. 28, 2009.*

* cited by examiner

| Device Identifiers | Protocols | Functions |
|---|---|---|
| Device ID 1 | Protocol 1 | Function 1, Function 2, Function 3 |
| | Protocol 2 | Function 2, Function 3, Function 4, Function 5 |
| | Protocol 3 | Function 3, Function 6 |
| Device ID 2 | Protocol 1 | Function 5, Function 7, Function 8 |
| | Protocol 3 | Function 1, Function 2, Function 3 |
| | - | Function 3, Function 6 |
| | - | Function 9 |
| ... | ... | ... |

Database of Devices 230

FIG. 3

| Task | Protocol | Function | Priority |
|---|---|---|---|
| Task 1 | Protocol 1, Protocol 2 | Function 2 | Protocol 2, Protocol 1 |
| Task 2 | Protocol 2 | Function 4 | - |
| Task 3 | Protocol 1, Protocol 2, Protocol 3 | Function 3 | Protocol 3, Protocol 1, Protocol 2 |
| ... | ... | ... | ... |

Database of Rules 220

FIG. 4

SYSTEM AND METHOD FOR PERFORMING ADMINISTRATIVE TASKS ON MOBILE DEVICES

CROSS-REFERENCE TO RELATED APPLICATIONS

This application claims benefit of priority under 35 U.S.C. 119(a)-(d) to a Russian Application No. 2012141472 filed on Sep. 28, 2012, which is incorporated by reference herein.

TECHNICAL FIELD

The present disclosure generally relates to the field of administration of mobile communication devices, and specifically to systems, methods and computer program products for selecting management protocols for performing remote administrative tasks on mobile devices.

BACKGROUND

The growth in popularity of mobile communication devices, such as smart phones, tablets, laptops and the like, has reached very high levels in the past decade. Since the use of the mobile devices is so widespread, there are now new malicious software programs (i.e., malware) that specifically target mobile devices. These programs usually aim to steal confidential information by acquiring control over mobile devices, which is often done via use of the malicious software that receives privileges of a super-user, allowing unauthorized remote access to the mobile device, or steal money by sending unauthorized paid messages or making calls to the phone numbers registered to the perpetrators. According to the data collected by Kaspersky Lab, the number of malicious software programs that are oriented towards mobile devices has grew more than six times in the year 2011 alone.

In addition, due to their portable nature, mobile devices are vulnerable to theft and loss, which increases the risk of an attacker to gain access the information stored on the device.

At the same time, there has been an increased tendency by employees to use mobile devices, such as notebooks and smartphones, to access corporate network. For instance, many companies favor the concept known as "Bring Your Own Device" (BYOD), which allows the employees to use their own mobile devices for work in the corporate intranet. Obviously, the increased use of mobile devices for access to the corporate information, coupled with the increase of threats to mobile devices caused by malware and potential loss of mobile devices by employees, creates additional information security risks to the company.

To address security concerns, mobile devices usually support various management protocols that allow remote management of such devices by administrative servers. The management protocols typically used to perform various administrative tasks, such as, for instance, establishing security policies on the device, such as setting a certain length and complexity requirements for password for accessing functionality of the mobile device, specifying the number of attempts of entering an incorrect password before the device is blocked or disabled, setting up rules for blocking or disabling devices in case an unauthorized access to the device is detected. In addition, management protocol may be used to remotely disable the device and/or delete all confidential and personal information from the device's memory in case the device is lost or stolen.

The management protocols supported by a mobile device usually depend on the device's operating system. For instance, Apple's iPhone operating system iOS version 4.0 and higher supports Exchange ActiveSync (EAS) and Mobile Device Management (iOS MDM) protocols. However, these protocols support different sets of functions. For instance, the EAS protocol has a function of establishing a limit on how long the e-mail messages can be kept for synchronization and a function for encoding the device, neither of which exist in the iOS MDM protocol. Meanwhile, the iOS MDM protocol has functions for remote blocking of the device and resetting of the password, which are absent in the EAS protocol. The Table 1 below shows the comparison of available functions in both aforementioned protocols.

TABLE 1

| Functions | IOS MDM | EAS |
|---|---|---|
| The requirement of using password for the device | + | + |
| Setting a minimal length for the password | + | + |
| Setting a maximal number of attempts to enter an incorrect password | + | + |
| The requirement of using both letters and numbers in the password | + | + |
| Setting the amount of time for inactivity | + | + |
| Forbiddance of using a simple password | + | + |
| Setting a number of days for the password use (password expiration in days) | + | + |
| Activation of history of the passwords' entry | + | + |
| Setting a minimal number of complex symbols in the password | + | + |
| The requirement of manual synchronization while in roaming mode | + | + |
| The permission request for camera use | + | + |
| The permission request for the use of web browser | + | + |
| Setting the length of time the e-mail messages can be kept for synchronization | | + |
| The requirement for encoding the device | | + |
| The remote deletion of device data (wipe) | + | + |
| The remote locking of the device | + | |
| The password reset | + | |
| Setting the restriction on applications' installations | + | |
| Setting the restriction on capturing screen shots | + | |
| Setting the restriction on voice dialing in the blocked mode | + | |
| Setting the restriction on in-application purchases | + | |
| Setting the restriction on the number of the encrypted backups created in the iTunes | + | |
| Setting the restriction on the use of certain audio-recordings in the iTunes | + | |
| The permission request to give ratings to movies, TV programs, and applications | + | |
| Setting the restriction on changing of the security preferences in the web browser "Safari" | + | |
| Setting the restriction on the use of "YouTube" | + | |
| Setting the restriction on the use of "iTunes" store | + | |
| Setting the restriction on the use of "The Apps Store" | + | |
| Collecting information on the installed applications | + | |
| Collecting information on the profile installed with expiry dates | + | |
| Collecting information on the installed network | + | |
| Collecting information on the device | + | +/− |
| Collecting information on the configuration and profile | + | |
| Automatic detection of the "Exchange" server | | + |

Symbol "+" indicates that a function is present, and symbol "+/−" indicates that function is optional Although EAS and iOS MDM protocols support many different functions, these protocols also have many functions in common. For example, both protocols set a maximal number of attempts to enter an incorrect password and set a minimal number of complex symbols in the password on mobile device. However, different protocols may use different mechanisms to perform the same functions by, e.g., requiring different number of message exchanges or encryption of exchanged data. As such, one protocol may be more efficient or secure then another protocol in performing certain functions, while another protocol may be more effective in performing other functions. When a mobile device supports several protocols, the administrative server or the device selects one of the protocols for performing all of the functions supported by this protocol. However, it is desirable to selectively choose one protocol for performing some functions and another protocol for performing other functions

SUMMARY

Disclosed are system, method and computer program product for remote administration of mobile devices and, in particular, for dynamic selection of different functions from different protocols. The system includes an administration server that receives a request to perform a remote administrative task on a mobile device. The server selects a function that performs the requested remote administrative task. The server identifies one or more protocols that perform the selected function, wherein different protocols use different mechanisms to perform the same function. The server determines if the mobile device supports one or more of the identified protocols. When the mobile device supports two or more different protocols, the server selects a protocol with the highest priority for performing the selected function. The server then executes the selected protocol to perform the selected function that performs the requested remote administrative task on the mobile device.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings:

FIG. 3 illustrates an example embodiment of a database of devices of the system for selection of functions for control of mobile device.

FIG. 4 illustrates an example embodiment of a database of rules of the system for selection of functions for control of mobile device.

DETAILED DESCRIPTION OF EXAMPLE EMBODIMENTS

Example embodiments of the present invention are directed to systems, methods and computer program products for remote administration of mobile devices and, in particular, to dynamic selection of different administrative functions from different management protocols. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
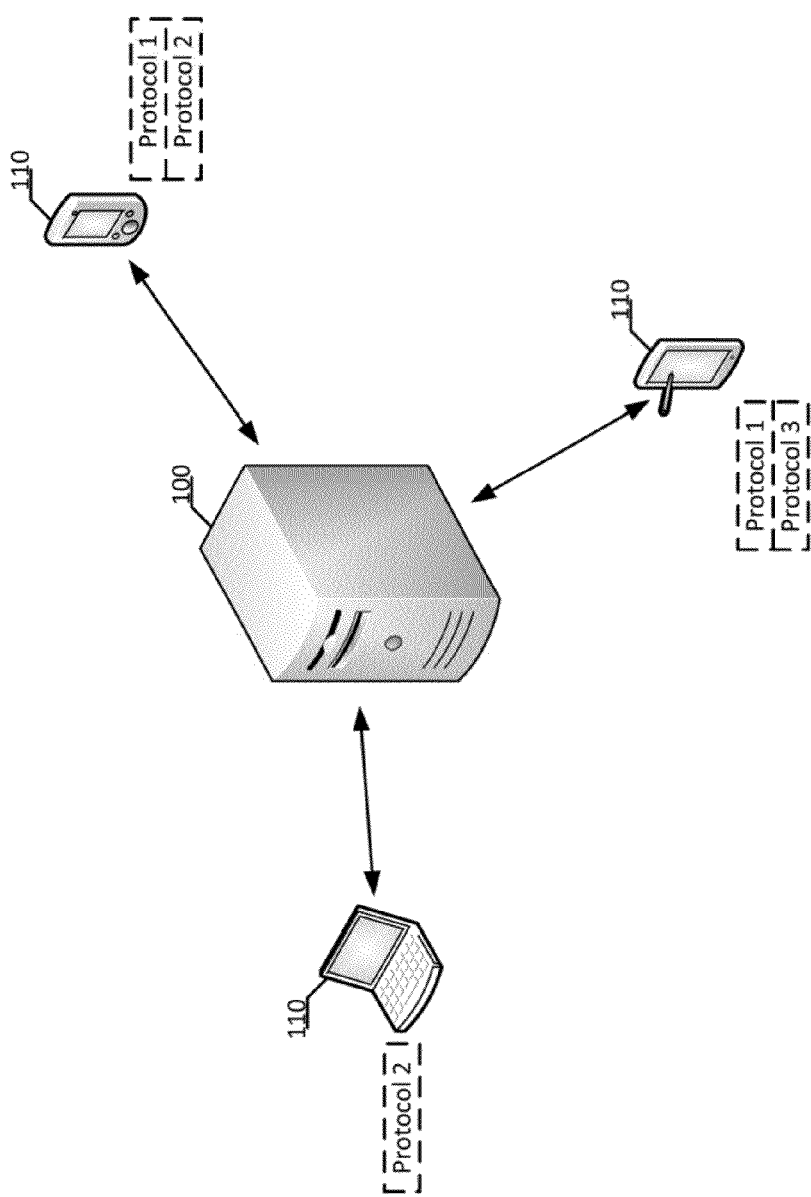
FIG. 1 illustrates an example embodiment of a system for remote administration of mobile devices in a corporate network.

FIG. 1 shows an example embodiment of a system for remote administration of mobile devices in a corporate network. The system includes an administrative server 100 and a plurality of mobile devices 110. Each mobile device 110 supports one or more management protocols: Protocol 1, Protocol 2 and/or Protocol 3. The mobile devices 110 can communicate with the administrative server 100 using any known networking technologies, such as Ethernet, Wi-Fi, Bluetooth, GSM, or others. The administrative server 100 cannot manage all mobile devices 110 using one protocol, as none of the protocols are supported by all of the mobile devices 110. The system and methods disclosed herein provide administrative control over all the devices independently from the protocols supported by these devices.

Figure 2:
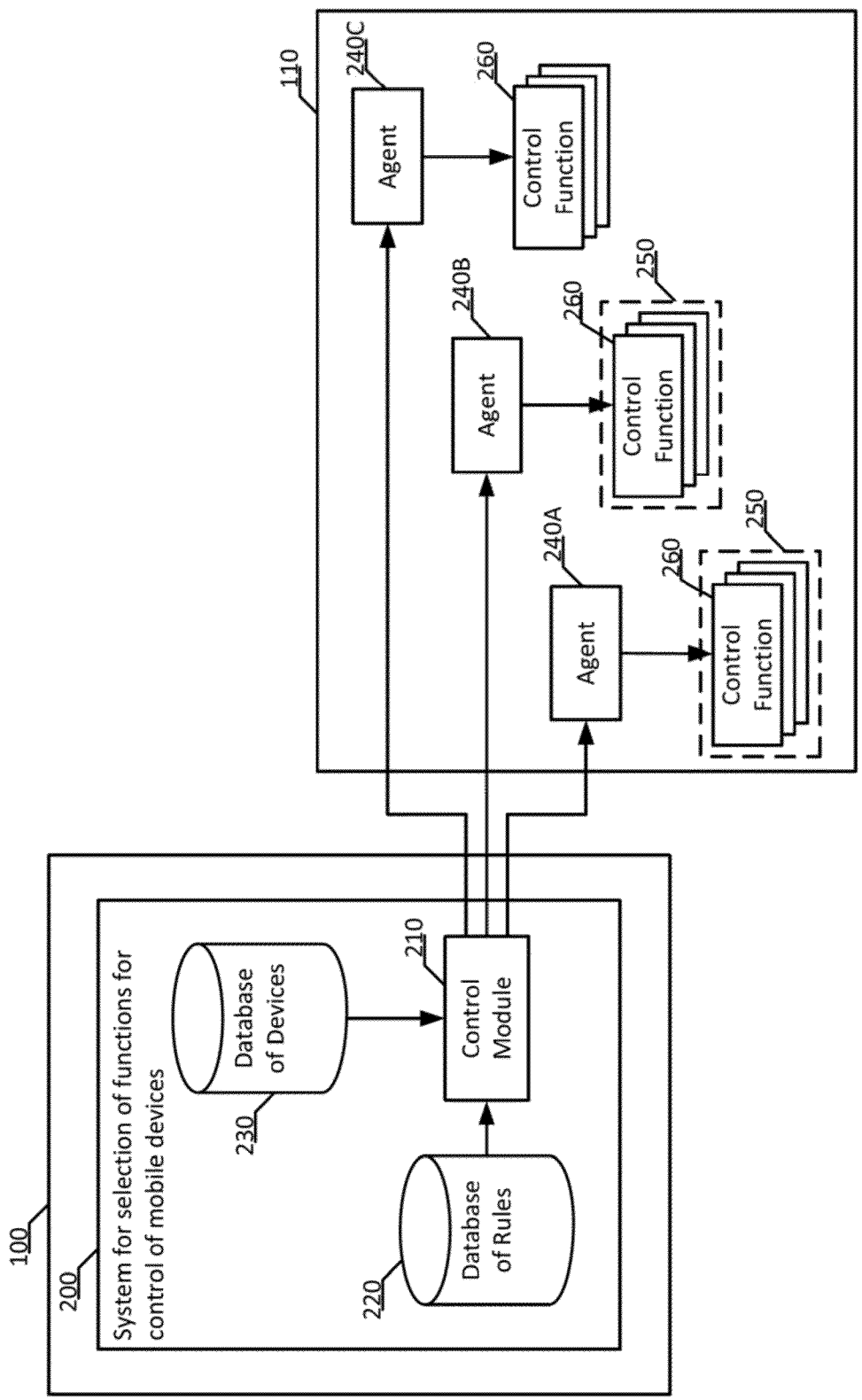
FIG. 2 illustrates an example embodiment of a system or selection of functions for control of mobile device.

FIG. 2 shows an example embodiment of a system for selection of functions for control of mobile device. Each of the mobile devices 110, connected to the administrative server 100, supports a different number of the management protocols 250 and control functions 260. The number of the management protocols supported by the device 110 is not limited by the number shown in the figure. On the mobile devices, administrative agents 240 are used to implement different control functions 260 of the management protocols 250 and communicate with the administrative server 100 using these protocols. For example, the administrative server 100 may deploy (e.g., install) the administrative agents 240 on the mobile device 110 and communicate with these agents 240 using EAS, iOS MDM and other protocols, to implement administrative functions specified in Table 1 and other administrative functions.

The server 100 can collect information about protocols and functions supported by each mobile device using various methods. For example, the agent 240 can send to the server information about the operating system (OS) of the device 110 and versions of the management protocols 250 supported by the device 110. Generally, functions supported by a protocol are based on the version of the protocol and version of the OS. Therefore, based on the information received from the administrative agent 240 about the versions of the OS and versions of protocols supported by the mobile device 110, the administrative server 100 can determine which administrative functions are supported by the mobile device 110. Agents 240 also configured to execute these functions on device 110 upon request from the server 100.

In addition to functions 260 provided the management protocols 250, mobile devices 110 may implement independent administrative functions. For instance, in the application "TouchDown", made for the Android OS, there are functions of setting the access to the corporate e-mail. The control over such functions can be assigned to an independent application. Also, the device 110 can use other administrative functions, such as blocking the use of the Wi-Fi and Bluetooth modules; selective encoding or data removal; limiting access to data based on the location of the device; configuring VPN; installing digital certificates, and other functions. In one example implementation, a dedicated agent 240 may be configured to collect information about independent administrative functions supported by mobile device 110 and to send it to the server 100. Agents 240 also configured to execute these functions upon request from the server 100.

The collected information about protocols and administrative functions supported by the mobile devices 110 as well as the information that identifies devices 110 is stored in a database of devices 230 of the system for selection of the administrative functions for control of the mobile devices 200, which is implemented by the administrative server 100. The information for identification of devices 110 can include an international identifier of the mobile equipment (IMEI), a serial number of the device, MAC-address, the identification number of the SIM card (e.g., the Integrated Circuit Card ID) or other unique identifiers.

The system of selection of the administrative functions of the mobile devices 200 also includes a database of the rules for using administrative functions 220. This database contains the rules that specify which functions are used to perform which administrative tasks. For example, a rule for implementing the task of "The requirement for encoding the device" would select a corresponding function (see Table 1) from protocol EAS because protocol iOS MDM does not support this function. Similarly, a rule for implementing the task of "The remote locking of the device" would select a corresponding function from the protocol iOS MDM because EAS protocol does not support this function. When both protocols support similar functions, e.g., "Remote deletion of device data", the effectiveness of the implementation of the same function in different management protocols is considered and higher priority is given to the protocol that performs the same task in a more efficient manner, e.g., with faster speed or less delay, with fewer transmissions, or with less amount of data. To that end, the database of rules 220 contains rules that determine priorities in the implementation of identical or similar administrative functions 260 for different management protocols 250.

In case of theft or loss of the mobile device 110, the amount of time passed from the moment the server 100 has sent the command to perform the function of the remote deletion of device data and until the deletion is actually done is critical. Therefore, one of the criteria for determining the effectiveness of the performance of an administrative function is the amount of time passed from the moment the server has sent the command to the time of the task's completion on the device (the speed of the function's execution). For example, if the function of "Remote deletion of device data" performed in the iOS MDM protocol faster than the same function in the EAS protocol, then for the task of "Remote deletion of device data", the said function of the iOS MDM protocol will have higher priority. Thus, a protocol that performs a function faster may have higher priority than protocols that perform the same function slower.

At the same time, several administrative functions may be performed consecutively on the device. For example, the following two functions are performed consecutively:

| Function | The time of execution in the iOS MDM protocol | The time of execution in the EAS protocol |
| --- | --- | --- |
| Remote deletion of device data | 1 sec | 3 sec |
| Permission request to use the camera on the device | 5 sec | 1 sec |

In the above example, the total amount of time taken for the execution of both functions is minimized when "Remote deletion of device data" function is performed using iOS MDM protocol and "Permission to use the camera" is performed using EAS protocol. However, one must consider the additional time required for initialization and synchronization of each of the protocols between the mobile device and the server. For that reason, in the example above, the total time of the consecutive execution of the aforementioned functions using both protocols can exceed the total time of the consecutive execution of these functions using only EAS protocol. For that reason, the other possible criteria of measuring the effectiveness is the total time of consecutive execution of two or more functions on the mobile device. Therefore, a protocol that performs consecutively two or more function faster may have higher priority than protocols that perform consecutively the same two or more functions slower.

In addition, similar functions in different management protocols may have different number of parameters. For example, in one protocol, the function of "Remote deletion of device data" may include the choice of a category of files selected for deletion, such as "Pictures", "Contacts", "Documents", "Messages", and so on. In another protocol, the deletion of data on the device is done for all categories of files without an option to select specific types of files. Therefore, another criterion for measuring effectiveness of the function's performance is the number of different function parameters in each protocol, wherein a protocol having the same function with greater number of parameters may have higher priority than protocols having the same functions but with a smaller number of parameters.

The rules for assigning priority to functions and protocols can be created based on the analysis of the effectiveness of implementing functions in various management protocols.

The control module 210 of the system of selection of the administrative functions of the mobile devices 200 is designed to transfer commands to perform administrative functions to the agents 240 on the device 110. When it is necessary to execute a specific administrative task on a specific device 110, the control module 210 turns to the database of rules 220. Using this database, the control module 210 determines which administrative function corresponds to the task at hand. After that, the control module 210 determines if this specific function is supported on this particular device by using the database of the devices 230. If this function is supported, the control module 210 sends the command for the execution of the said function to the corresponding agent 240 that supports the selected function on the device 110.

If the database of rules 220 contains several functions for the execution of the necessary task, and each of these functions has a particular priority for execution, the control module 210 sends the command to perform the function that has the highest priority and is supported by the device 110. For instance, if the database of rules 220 has two corresponding functions from the protocols EAS and iOS MDM for the task of "Remote deletion of device data", and the function from the protocol iOS MDM has higher priority, while the database of devices 230 has the information that both protocols are supported by the device 110, then the function from the protocol iOS MDM is going to be performed on that device. If, given the same conditions, the information in the database of devices 230 says that the device supports only the EAS protocol, then the function from this particular protocol is going to be implemented on the device 110. The agent 240 then executes this function on the device 110.

FIG. 3 shows an example embodiment of the structure of the database of devices 230. The database 230 contains the identifiers of every device 110 that is managed by the administrative server 100. As it was said before, a device's identifier can be the international identifier of the mobile equipment (IMEI), the serial number of the device, MAC-address, the identification number of the SIM card (e.g., ICCID), and any other information that uniquely identifies the device 110. The database of devices 230 also contains the information on the supported protocols and the functions implemented within those protocols, as well as on independent administrative functions in use without a protocol, for every mobile device 110.

FIG. 4 shows an example embodiment of the structure of the database of rules for implementation of the functions 220. An administrative function and the corresponding protocol (if the function is in use within a protocol) are assigned to every administrative task. In case a function, serving a specific administrative task (i.e., "Task 1" or "Task 2"), is implemented in several protocols, then these protocols are assigned a priority of execution.

Figure 5:
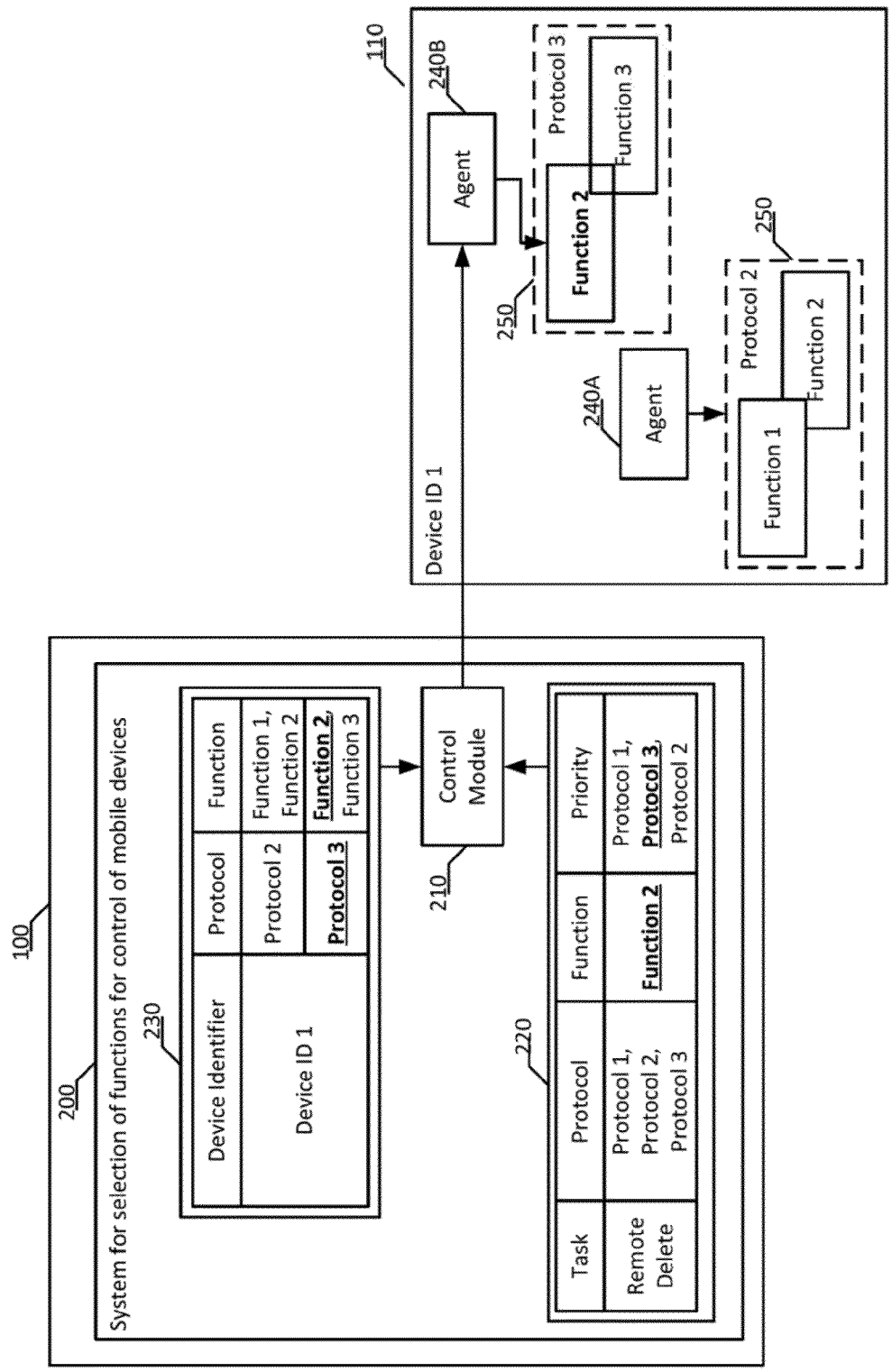
FIG. 5 illustrates example of operation of the system of selection of the administrative functions of the mobile devices.

FIG. 5 shows an example operation of the system of selection of the administrative functions of the mobile devices. The device 110 with its unique identifier "Device ID 1" supports the management protocols "Protocol 2" and "Protocol 3". The management protocol "Protocol 2" implements functions "Function 1" and "Function 2". The management protocol "Protocol 3" implements functions "Function 2" and "Function 3". On the mobile device, both "Protocol 2" and "Protocol 3" are implemented using corresponding administrative agents 240A and 240B. The agents 240 send to the server 100 information about "Protocol 2" and "Protocol 3" supported by the mobile device 110 and the functions implemented in these protocols: "Function 1", "Function 2", and "Function 3". The "Function 2" is implemented in both protocols. In the database of rules 220, the "Function 2", which is implemented in protocols "Protocol 1", "Protocol 2", and "Protocol 3", is assigned to the administrative task of "Remote deletion of device data". This function has highest priority in "Protocol 1". Then, in the consecutive order of priorities, there are "Protocol 3" and "Protocol 2". When the task of the "Remote deletion of device data" is requested the control module 210 determines based on data stored in the database 220 that the "Function 2" of the "Protocol 1" has a higher priority. However, according to the information in the database of devices 230, this particular protocol is not supported by the device 110. That is why control module 210 gives the command to execute the "Function 2" from the "Protocol 3", which has a higher priority within all management protocols, and is supported by the mobile device 110.

Figure 6:
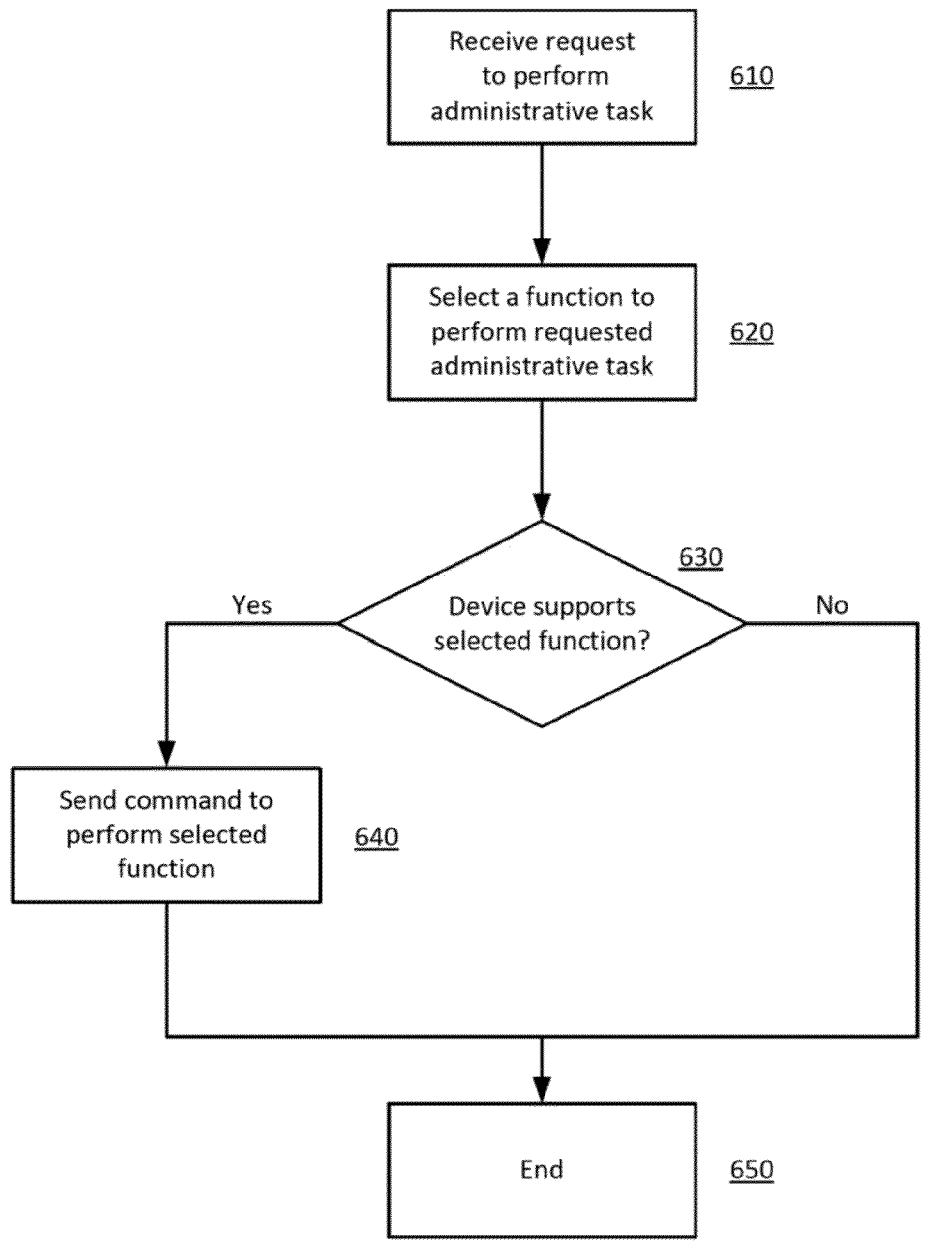
FIG. 6 illustrates an example method for selection of functions for control of mobile device.

FIG. 6 shows an example method for selection of functions for control of mobile device. At step 610, the control module 210 receives a request to perform a specific task on the mobile device 110. At step 620, the control module 210 determines which function is suitable for this task by going through the database of rules 220. At step 630, the control module 210 checks the database of devices 230 to see if this function is supported by the device 110. If the function is supported, at step 640, the control module 210 gives the command to execute this function to the corresponding agent 240. The process ends at step 650. If this function is not supported on the device 110, the process is ended at 650 without any action. One should note that the shown algorithm is designed for a case when the database of the rules for implementation of the functions 220 does not contain the rules that determine a priority of execution of administrative functions. If the database 220 does contain such rules, then, at step 630, the system will check for the function with the first priority among those supported by the device 110. The check for the functions with a lower priority will happen only, if the function with higher priority is not supported by this device.

Figure 7:
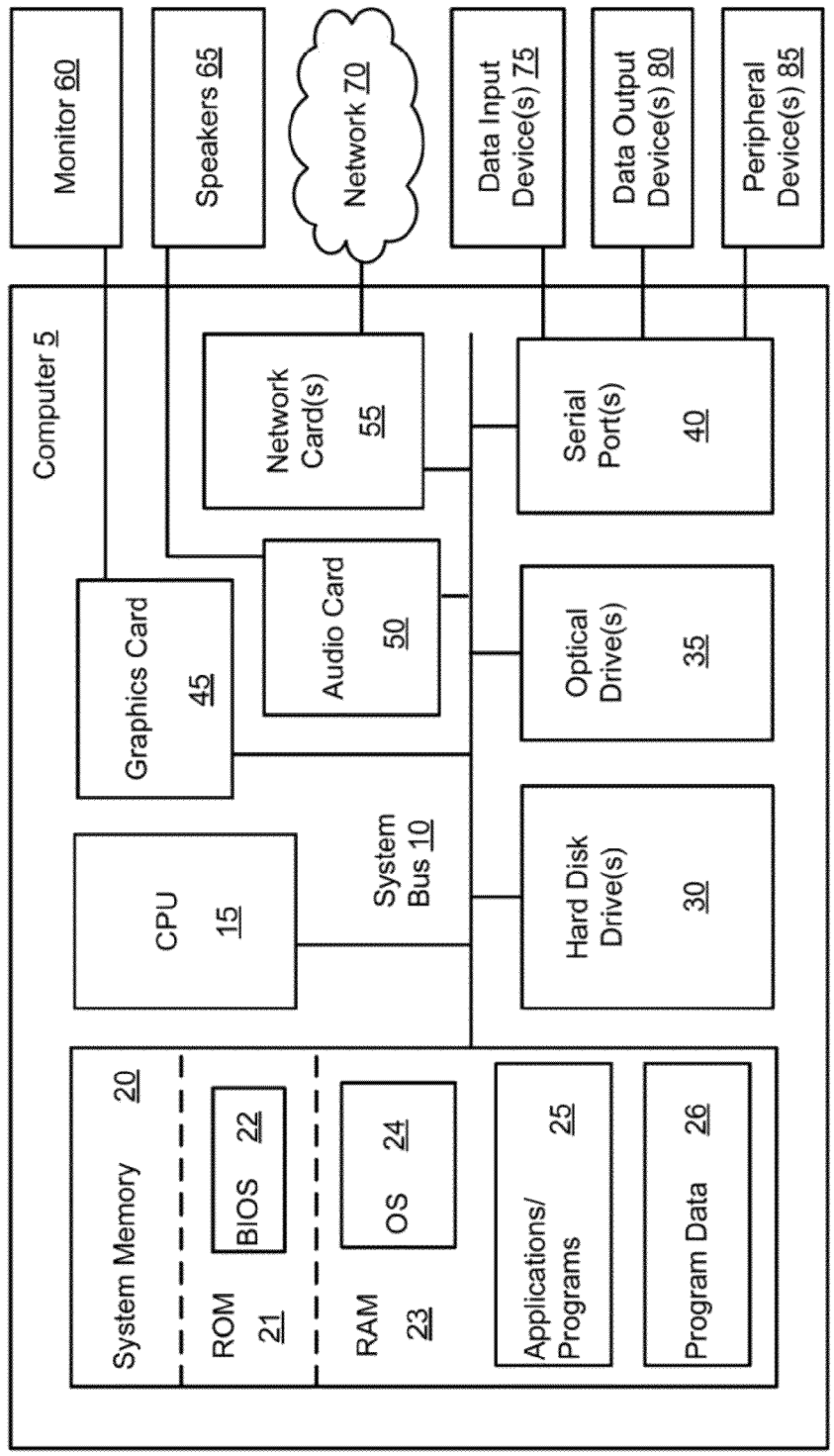
FIG. 7 illustrates a block diagram of a general-purpose computer suitable for implementing the system for remote administration of mobile devices in a corporate network.

FIG. 7 depicts one example embodiment of a computer system 5, which could be used to implement the system and methods for selection of functions for control of mobile device described herein. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the functions may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method executable by a remote administrative server for administration of mobile devices, comprising:
   receiving a request to perform a remote administrative task on a mobile device;
   selecting a function that performs the remote administrative task;
   identifying a plurality of management protocols that perform the function;
   determining, based on a database comprising information collected from the mobile device, if the mobile device supports one or more of the plurality of management protocols;
   when the mobile device supports two or more different management protocols among the plurality of management protocols, selecting, from the two or more different management protocols, a protocol with a highest priority for performing the function, wherein same functions performed in different management protocols have different numbers of function parameters, and wherein a priority of the protocol is selected based on the number of function parameters in the function of each protocol, wherein a protocol performing the function with a greater number of function parameters has higher priority than protocols performing the same function but with a lesser number of function parameters; and
   executing the protocol to perform the function that performs the remote administrative task on the mobile device.

2. The method of claim 1, further comprising:
   deploying by the remote administrative server an administration agent on the mobile device;
   collecting by the administration agent information about the management protocols supported by the mobile device; and
   storing the information on the administrative server.

3. The method of claim 2, further comprising deploying different administration agents on the mobile device, wherein each administration agent is associated with each management protocol supported by the mobile device, and wherein each administration agent provides communication with the administrative server using the associated protocol.

4. The method of claim 1, wherein the remote administrative task includes a security task performed by the remote administrative server on the mobile device.

5. The method of claim 1, wherein the priority of the management protocol is further selected based on a time duration for performing same functions by each protocol, wherein a protocol that performs the function in a shorter time duration has higher priority than protocols that perform the same function in a longer time duration.

6. The method of claim 1, wherein the priority of the management protocol is further selected based on a total time duration for performing consecutively two or more functions by each protocol, wherein a protocol that performs consecutively two or more function in a shorter time duration has higher priority than protocols that perform consecutively the same two or more functions in a longer time duration.

7. A computer system for administration of mobile devices by a remote administrative server, comprising;
   a hardware processor configured to:
      receive a request to perform a remote administrative task on a mobile device;
      select a function that performs the remote administrative task;
      identify a plurality of management protocols that perform the function;
      determine, based on a database comprising information collected from the mobile device, if the mobile device supports one or more of the plurality of protocols;
      when the mobile device supports two or more different management protocols among the plurality of management protocols, select, from the two or more different management protocols, a protocol with a highest priority for performing the function, wherein same functions performed in different management protocols have different numbers of function parameters, and wherein a priority of the protocol is selected based on the number of function parameters in the function of each protocol, wherein a protocol performing the function with a greater number of function parameters has higher priority than protocols performing the same function but with a lesser number of function parameters; and
   execute the protocol to perform the function that performs the remote administrative task on the mobile device.

8. The system of claim 7, wherein the processor is further configured to:
deploy an administration agent on the mobile device;
collect by the administration agent information about the management protocols supported by the mobile device; and
store the information on the administrative server.

9. The system of claim 8, wherein the processor is further configured to deploy different administration agents on the mobile device, wherein each administration agent is associated with each management protocol supported by the mobile device, and wherein each administration agent provides communication with the administrative server using the associated protocol.

10. The system of claim 7, wherein the remote administrative task includes a security task performed by the remote administrative server on the mobile device.

11. The system of claim 7, wherein the priority of the protocol is further selected based on a time duration for performing same functions by each management protocol, wherein a protocol that performs the function in a shorter time duration has higher priority than protocols that perform the same function in a longer time duration.

12. The system of claim 7, wherein the priority of the management protocol is further selected based on a total time duration for performing consecutively two or more functions by each protocol, wherein a protocol that performs consecutively two or more function in a shorter time duration has higher priority than protocols that perform consecutively the same two or more functions in a longer time duration.

13. A computer program product embedded in a non-transitory computer-readable storage medium, the computer program product comprising computer-executable instructions for administration of mobile devices by a remote administrative server, including instructions for:
receiving a request to perform a remote administrative task on a mobile device;
selecting a function that performs the remote administrative task;
identifying a plurality of management protocols that perform the function;
determining, based on a database comprising information collected from the mobile device, if the mobile device supports one or more of the plurality of management protocols;
when the mobile device supports two or more different management protocols among the plurality of management protocols, selecting, from the two or more different management protocols, a protocol with a highest priority for performing the function, wherein same functions performed in different management protocols have different numbers of function parameters, and wherein a priority of the protocol is selected based on the number of function parameters in the function of each protocol, wherein a protocol performing the function with a greater number of function parameters has higher priority than protocols performing the same function but with a lesser number of function parameters; and
executing the protocol to perform the function that performs the remote administrative task on the mobile device.

14. The computer program product of claim 13, further comprising instructions for:
deploying by the remote administrative server an administration agent on the mobile device;
collecting by the administration agent information about the management protocols supported by the mobile device; and
storing the information on the administrative server.

15. The computer program product of claim 13, further comprising instructions for deploying different administration agents on the mobile device, wherein each administration agent is associated with each management protocol supported by the mobile device, and wherein each administration agent provides communication with an administrative server using the associated protocol.

16. The computer program product of claim 13, wherein the priority of the management protocol is further selected based on a time duration for performing same functions by each protocol, wherein a protocol that performs the function in a shorter time duration has higher priority than protocols that perform the same function in a longer time duration.

17. The computer program product of claim 13, wherein the priority of the management protocol is further selected based on a total time duration for performing consecutively two or more functions by each protocol, wherein a protocol that performs consecutively two or more function in a shorter time duration has higher priority than protocols that perform consecutively the same two or more functions in a longer time duration.

* * * * *